United States Patent [19]

Krufka

[11] Patent Number: 4,525,735

[45] Date of Patent: Jun. 25, 1985

[54] SYSTEM FOR MEASURING AND IDENTIFYING LINE SPACING ON A CURVED SURFACE

[75] Inventor: Frank S. Krufka, Mount Joy, Pa.

[73] Assignee: RCA Corporation, Princeton, N.J.

[21] Appl. No.: 466,595

[22] Filed: Feb. 15, 1983

[51] Int. Cl.[3] .............................................. H04N 9/62

[52] U.S. Cl. ........................................ 358/10; 358/107

[58] Field of Search ..................... 358/10, 65, 66, 106, 358/107, 139; 356/384, 387, 239

[56] References Cited

U.S. PATENT DOCUMENTS

| | | | |
|---|---|---|---|
| 2,487,865 | 11/1949 | Glassey | 201/63 |
| 2,999,944 | 9/1961 | Laycak | 250/219 |
| 3,578,906 | 5/1971 | Holmstrom et al. | 178/6 |
| 3,609,307 | 9/1971 | Totsuka | 235/92 DN |
| 3,889,117 | 6/1975 | Shaw | 250/332 |
| 3,909,602 | 9/1975 | Micka | 235/151.3 |
| 4,148,065 | 4/1979 | Nakagawa et al. | 358/106 X |
| 4,156,563 | 5/1979 | Kato et al. | 354/25 |
| 4,282,510 | 8/1981 | Southgate | 358/106 X |
| 4,439,735 | 3/1984 | Alvite et al. | 358/10 X |

OTHER PUBLICATIONS

EG&G Reticon, 345 Potrero Avenue, Sunnyvale, California 94086, Brochure for H-Series Solid State Line Scanners 1024, 1728 & 2048 elements.

*Primary Examiner*—John C. Martin
*Assistant Examiner*—Michael Dunnam
*Attorney, Agent, or Firm*—E. M. Whitacre; T. H. Magee; L. L. Hallacher

[57] ABSTRACT

A system for measuring the black matrix on the faceplate of a color television picture tube provides measurements of the matrix line widths, the transparent space widths and the periods of the color barwidths formed by the lines and spaces.

15 Claims, 12 Drawing Figures

PIXEL OUTPUT TABLE

| | SPX 1 | SPX 2 | COLOR |
|---|---|---|---|
| (a) | HI | HI | G |
| (b) | HI | LO | G |
| (c) | LO | LO | G |
| (d) | LO | HI | R |
| (e) | HI | HI | R |
| (f) | HI | LO | R |
| (g) | LO | LO | R |
| (h) | LO | HI | B |

SYSTEM FOR MEASURING AND IDENTIFYING LINE SPACING ON A CURVED SURFACE

BACKGROUND OF THE INVENTION

This invention relates generally to a system for measuring line spaces on a curved surface and particularly to a system for measuring the line width, space width, and period of a black matrix on a kinescope faceplate.

During the production of picture tubes for color television receivers, a black matrix is applied to the inside surface of the faceplate panels. The black matrix consists of parallel lines which extend vertically as defined by the viewing orientation of the tube. Black lines are spaced at desired intervals leaving transparent glass in the spaces between the matrix lines. The transparent spaces are coated with slurries of materials containing phosphors which emit the three primary colors of light red, green and blue when impacted by electrons. The three phosphors are alternately applied in a repetitive sequence such as red, green and blue to all the transparent spaces of the panel. Prior to the application of the phosphors, it is desirable to measure the barwidths formed by the transparent spaces and the opaque matrix lines to verify that they are within acceptable dimensional tolerances in order to avoid the expensive application of phosphors to improperly matrixed faceplates.

In order to measure the line widths and space widths of each barwidth, the faceplate panel is placed between a stationary light source and a detector. Light is passed through the spaces within the matrix to the light detector. A portion of the panel is scanned with light in a direction substantially perpendicular to the matrix lines and the variation in light caused by the opaque lines and the transparent spaces is detected by the detector and provided to a measuring system. The panel is moved to various positions and the scanning and measuring repeated. The panel surface which carries the matrix is curved and accordingly linear motion of the faceplate would cause the distance from the light source to the matrix lines to vary and the projection of the matrix lines on the detecting elements within the detector would also vary. For this reason, the relative motion of the panel and the light source is accomplished utilizing a device which maintains a curved surface a constant distance from a stationary point as the surface moves relative to the point. A device which accomplishes such motion is described in application Ser. No. 466,594 entitled "Device for Maintaining a Moving Curved Surface a Constant Distance from a Stationary Point" filed on even date herewith by Larry S. Gullman, the disclosure of which is incorporated by reference herein.

The verification of the acceptability of the matrix requires investigation of four matrix characteristics. Three color phosphors are used in producing a color television picture, and accordingly every fourth transparent space receives the same color producing phosphor. For this reason as the spaces are measured, an unacceptable space must be associated with a particular color to assist in correcting the processing step which caused the unacceptability. Additionally, the widths of the transparent spaces must be measured to assure that the proper amount of each phosphor can be applied. Also, the widths of the opaque lines must be measured to assure that the matrix lines are not visible to the viewer. Finally, the period of the matrix pattern must be measured to assure that the proper ratio of phosphor and black matrix can be applied to the panel. The instant invention is directed a system which fulfills these requirements.

SUMMARY OF THE INVENTION

A system for measuring matrix barwidths composed of opaque lines and transparent spaces, includes an array of energy responsive pixels. The pixels provide analog pixel signals having one level when energy is received from a line, and a different level when energy is received from a space to provide an analog video signal varying between the two levels in accordance with the lines and spaces. A quantizer circuit receives the analog video signal and provides a digital video signal. A counter provides a pixel count output in response to the pixel signals to identify the pixels of the array. Pixel check circuit means receives the pixel count output and provides selected pixel signals from several selected pixels. The selected pixel signals initially have one of the levels and subsequently change to the other level before returning to the initial level when the selected pixels transfer from the space of one of the barwidths to the line of the next of the barwidths. A barwidth sequence identification circuit receives the selected pixel signals and provides barwidth identification signals when the selected pixel signals return to the initial level. The digital video signal is applied to a measurement circuit which sequentially provides width signals representative of the widths of the barwidths. Barwidth identification means is responsive to the width signals and to the barwidth identification signals for providing the sequential identification of the barwidths. A calculation circuit means receives the digital video signal and the width signals and provides calculated barwidth signals and calculated space width signals.

DETAILED DESCRIPTION OF THE PREFERRED EMBODIMENTS

Figure 1:
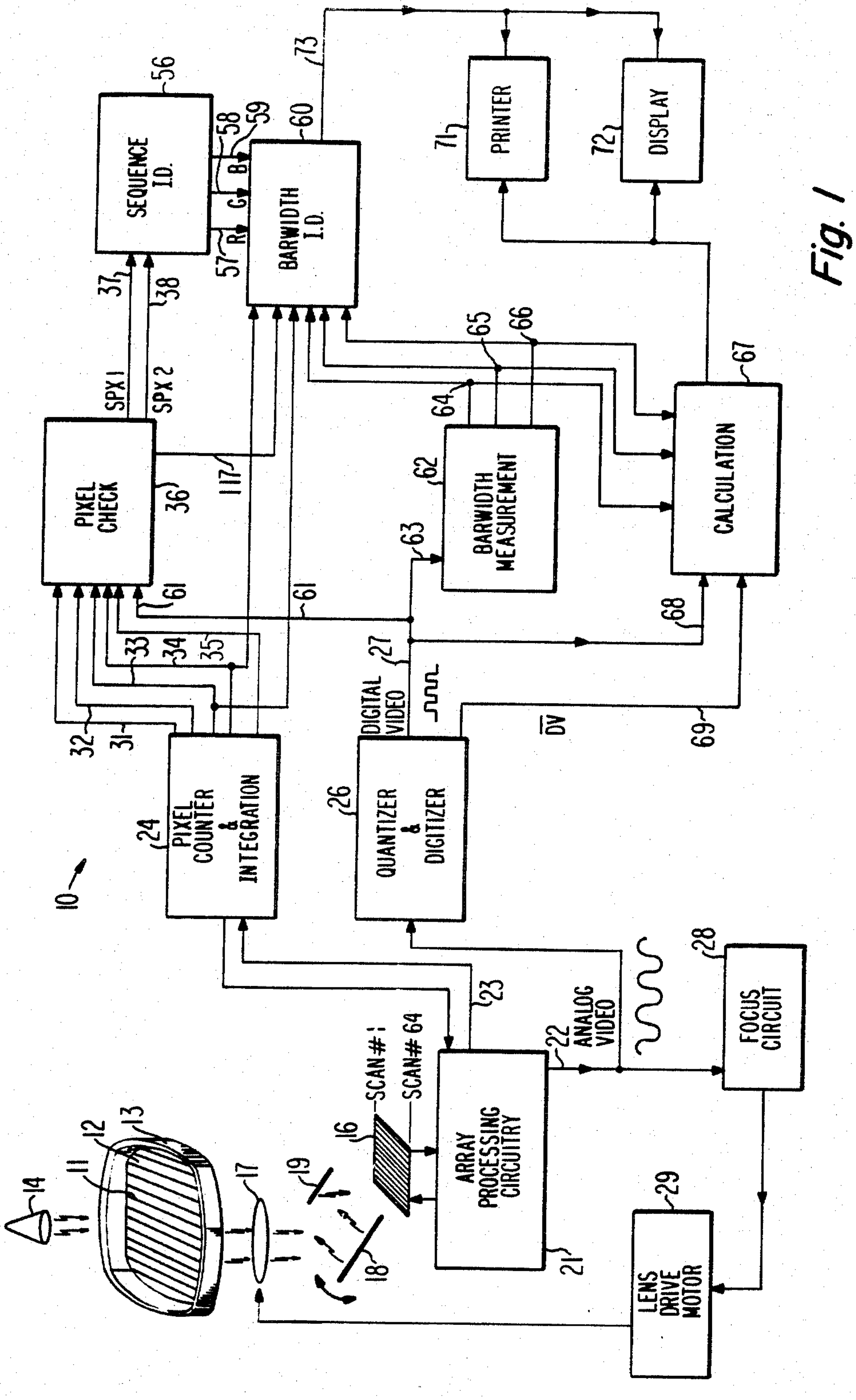
FIG. 1 is a block diagram of a preferred embodiment of a system for measuring line spacings on a curved surface.

FIG. 1 shows a system 10 for measuring the widths of the transparent spaces 12 and opaque matrix lines 11 as well as the period of the matrix on the inside surface of a faceplate panel 13 for a color television kinescope. The panel 13 is placed upon a holding device, which can be of the type described in application Ser. No. 466594 fully referenced hereinabove. The panel 13 is placed between a stationary point light source 14 and a stationary photodetector array 16. Light from the source 14 is blocked by the opaque lines 11 and passes through the transparent spaces 12 to a lens 17 which focuses the light onto a rotatable mirror 18. Light is reflected by the mirror 18 to another mirror 19 and to the photodetector array 16. The photodetector array 16 can be an H-Series model 1728 detector available from EG&G Reticon, and as such it has 1728 pixels which are individually responsive to light energy.

In making the measurements, the panel 13 is moved to a known initial position. The panel is next moved to, and stopped at, a first preselected position where measurements are to be taken. During the movement from the initial position to the preselected position, the color identification of the transparent spaces 12 is tracked. During the measurement, light from the source 14 passes through the transparent spaces 12 within the selected area of the panel 13 and is focused onto the mirror 18. The mirror is rotated and the light scans one line across the photodetector array 16, i.e., the line identified as scan #1 in FIG. 1. The mirror is then rotated slightly about an axis which is parallel to the plane of the paper and another line scanned across the photodetector array 16. This action continues until a large number of lines, such as sixty-four, have been scanned across the photodetector array and the results averaged.

Figure 10:
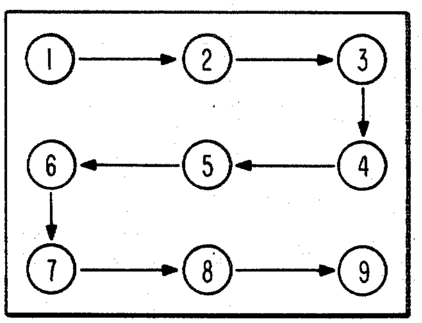
FIG. 10 is a simplified showing of the panel illustrating various areas where the matrix line widths and transparent space widths are measured on the panel.

As shown in FIG. 10, after the desired measurements are taken at the first preselected position identified as number 1, the panel is moved from left to right, with respect to the photodetector array 16, to the second preselected position number 2 where the measurement process is repeated. The panel 13 is sequentially moved through the desired number of positions, such as 1–9 in FIG. 10, and the measurements repeated at each position.

The photodiode array 16 produces an analog electrical signal which varies in magnitude according to the transparent spaces 12 and opaque lines 11. This analog signal is provided to an array processing circuit 21 which produces a string of pulses on the output line 23 and an analog video output signal on the output line 22. Because of the nature of the photodetectors within the array, the analog video signal varies between a low when the light passes through one of the transparent spaces 12 and a high when the light is blocked by one of the opaque lines 11. The signal available on the output line 23 is provided to a pixel counter and integration time circuit 24. The array processing circuitry 21 and the pixel counter and integration time circuit 24 are readily available in the art and their construction and operation are presented in the materials which accompany the photodiode array 16. Several photodiode arrays presently commercially available can be used; for example, the Reticon RL1728H photodiode array referred to hereinabove can be used.

The analog video signal available on the output line 22 is provided as an input to a quantizer and digitizer circuit 26 which is also readily available in the art. The circuit 26 quantizes the analog video signal at the 50 percent level and also converts the analog video signal into a digital video signal which is available on the output line 27. As light from the light source 14 passes through the lens 17, the images are magnified, for example by a factor of 10, so that the lines and spaces presented to the photodetector 16 appear to be larger then they actually are. Accordingly, an electrical signal which varies in accordance with the widths of the transparent spaces 12 and opaque lines 11 is obtained as a very accurate measurement of the line and space widths. However, the transitions between high and low of the analog video signal are not ideal because of distortions introduced by the lens 17. The quantizing and digitizing of the analog video signal at the 50 percent level remove the effects of these distortions and a very accurate measurement of the space 12 widths and line 11 widths can be made.

The analog video signal available on the output line 22 also is applied as an input to a focus circuit 28 the output of which is applied to a lens drive motor 29. The focus circuit 28 can be used to fine focus light from the lens 17 onto the photodetector array 16 after the panel is moved to the various positions shown in FIG. 10. The focus circuit 28 therefore accommodates for slight variations in the glass from which the panel 13 is made and also for other variations which can cause a slight defocusing as the panel is moved relative to the light 14. The focusing circuit 28 and the lens drive motor 29 are within the purview of one skilled in the art and additional details are not required herein.

In the array processing circuitry 21 of FIG. 1, the pixels of the photodiode array 16 are electronically sampled for all the pixels 1 through 1728. Each pixel is successively sampled whereby the output signal obtained during each scan of the array is a chain of 1728 pulses each of which is proportional to the light intensity on the corresponding diode. This train of pulses is fed by the output line 23 to the pixel counter and integration time circuit 24. The pixel counter steps one count for one particular transition (for example the rise side) of each of the pulses received from the array. The output of the counter therefore is a series of pixel count signals which identify the pixel being sampled. The pixel count signals are provided by output lines 31–35 to a pixel check circuit 36 the details of which are explained with reference to FIG. 2. The output of the pixel check circuit 36 is available on two output lines 37 and 38 as SPX1 and SPX2 signals respectively.

Figure 7:
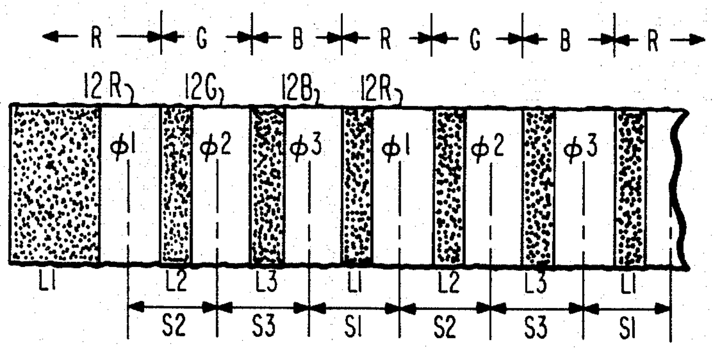
FIG. 7 is a portion of a faceplate panel including the black matrix lines.

As stated above, when the panel 13 is originally placed between the light source 14 and the photodetector array 16 the panel is moved to an initiating position without any attempt to take any measurements. The panel is next moved to position #1 of FIG. 10 where the first measurements are to be made. All panels are matrixed identically for all color picture tubes and accordingly the color to be received by the first transparent space 12 is always the same. For example, as shown in FIG. 7, the first three transparent spaces are identified 12R, 12G and 12B and respectively will receive red, green and blue light emitting phosphors. The fourth transparent space is identified 12R indicating that it also will receive red phosphor and indicating the repetitive nature of the pattern. Thus, the barwidths are grouped into sets of three with the corresponding barwidth of each set identifying the same color space.

In order to maximize the benefit of the measurement, it is necessary to know which color space is being scanned at a given instant. This is accomplished using the SPX1 and SPX2 signals available on lines 37 and 38 of the pixel check circuit 36 of FIG. 1. The SPX1 and SPX2 signals are the signals which are received from two selected pixels on the photodiode array 16. For example, the SPX1 signal can be received from pixel number 264 and the SPX2 signal can be received from pixel number 256. It should be noted that for the orientation shown in FIG. 1, pixel number 1 will be the left pixel of the array and pixel number 1728 will be the right pixel. The utilization of the pixels 256 and 264 to provide the SPX2 and the SPX1 signals are exemplary but are chosen within certain criteria. That is, the spacing between the selected pixels must be less than the width of the lines 11 and less than the width of the spaces 12 after magnification by the lens 17 so that both pixels can be simultaneously illuminated through one of the spaces 12 or simultaneously darkened by one of the lines 11.

Figure 8:
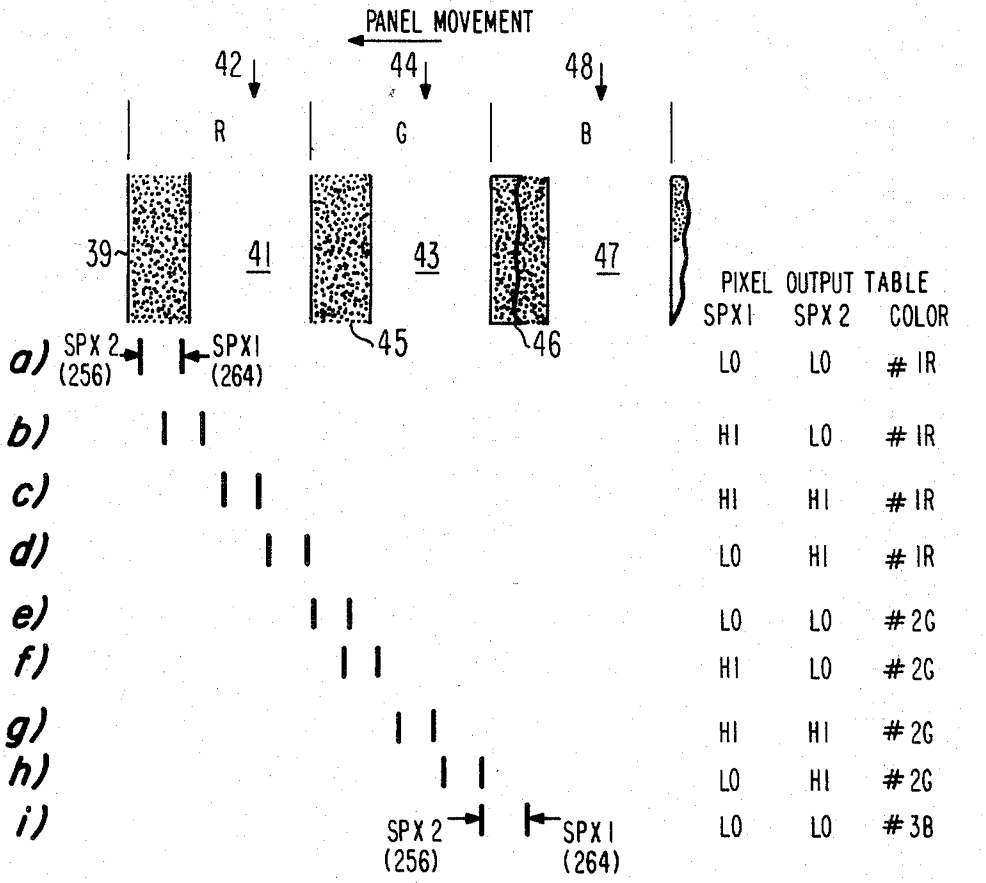
FIG. 8 shows how the color identifications of the transparent spaces are tracked when the panel is moving from right to left.

FIG. 8 is useful in understanding how the signals SPX1 and SPX2 are used to identify the color space which is being scanned at a particular instant. Position (a) is the initial position to which the panel is moved after being placed in the scanning device. Typically this position is an edge of the panel because the color sequence is known and the first space will receive a particular color phosphor, for example red. Pixels 256 and 264 are both under the first opaque line 39 which together with the first transparent space 41 forms the first bar width 42. The line 39 blocks light to the pixels 256 and 264 and accordingly the SPX2 and SPX1 signals are both low, as indicated in the Pixel Output Table. When movement of the panel begins toward the right to locate the panel at position #1 of FIG. 10, position (b) is reached and pixel 264 enters space 41 and as shown in the Table SPX1 goes high while SPX2 remains low. As motion continues, position (c) is reached and pixel 256 also enters the space 41 and SXP1 and SXP2 are both high. Motion continues to position (d) and pixel 264 goes beneath the opaque line 45 and SXP1 returns to low indicating that the green barwidth 44 has been entered. Motion continues to position (e) and pixel 256 also is beneath the opaque line 45 and SXP1 and SXP2 are both low indicating the end of the red barwidth 42 and the beginning of the green barwidth 44. As the panel motion continues, the pixels 256 and 264 pass through positions f, g and h until both pixels reach position (i) under the opaque line 46 of the blue barwidth 48 indicating the end of the green color bar 44. This tracking of the R, G and B color barwidths continues until the panel reaches position #1 of FIG. 10 and the motion of the panel is stopped. However, because of the tracking of the pixels 256 and 264 and because the first transparent space 11 of all panels is red, the selected pixels correlate the bar widths with a particular color. Also, when panel motion stops, the states of pixels 256 and 264 remain unchanged so that the color tracking is effectively stored. After the measurement scanning is completed at position #1, motion of the panel 13 toward the left is resumed to position #2 of FIG. 10. During this motion the correlation of the pixels 256 and 264 to the barwidth colors is resumed by the resumption of the tracking of pixels 256 and 264. Accordingly, the color of every space 11 is known when that space is subsequently scanned for measurement purposes.

Figure 9:
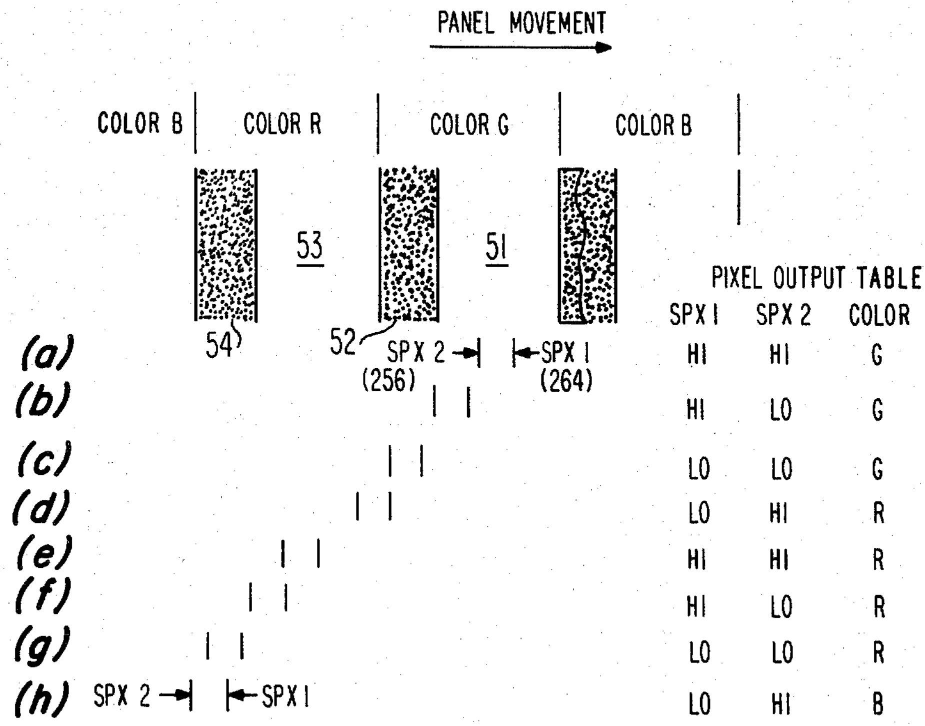
FIG. 9 shows how the color identifications of the transparent spaces are tracked when the panel is moving from left to right.

When measurement scanning is completed at position #4 of FIG. 10, the panel is moved from left to right but the color identification of the transparent spaces must be continued. FIG. 9 shows how the pixels 256 and 264 are used to continue the color tracking of the barwidth spaces. In FIG. 9, position (a) shows pixels 256 and 264 both beneath a transparent space 51 when the motion for position #4 of FIG. 10 is stopped. Thus, as shown in the table, both SPX1 and SPX2 are high. It should be noted that the condition of SPX1 and SPX2 when motion stops at position #4 is immaterial to accurate color tracking because the conditions are stored between the periods of panel motion. When motion of the panel to the right reaches position (b), pixel 256 is beneath the opaque line 52 and SPX2 goes low. When position (c) is reached, pixel number 264 also is beneath the line 52 and SPX1 also goes low. Motion continues to position (d) and pixel 256 is beneath the space 53 and SPX2 goes high indicating that the red color bar has been reached. Motion continues through positions e, f and g, until at position h pixel 256 is illuminated and pixel 264 is dark and SPX1 is low while SPX2 is high, indicating that the blue color bar width has been reached.

In FIG. 1, the SPX1 and SPX2 signals available on the lines 37 and 38 respectively, are applied as inputs to a sequence identification circuit 56, the details of which are described hereinafter with respect to FIG. 3. The sequence identification circuit 56 has three output lines 57, 58 and 59 which respectively provide input signals to a barwidth identification circuit 60 as the selected pixels 256 and 264 track the red, green and blue barwidths of the matrix. The barwidth identification circuit 60 is described hereinafter with respect to FIG. 5.

In FIG. 1, the digital video output signal available on the output line 27 of the digitizer 26 is provided as input to the pixel check circuit 36 by way of the line 61 and to a barwidth measurement circuit 62 by way of the line 63. The barwidth measurement circuit 62 accurately measures the barwidths of the matrix on the panel 13. Thus, for example, in FIG. 4*i*, the barwidth measurement circuit 62 provides a signal PI1 which is high to indicate the total width of the red barwidth 42 as determined by the combined widths of the opaque line 39 and the transparent space 41 (FIG. 8). In FIG. 1, the barwidth measurement circuit 62 has three output lines 64, 65 and 66. The barwidth measurement signal PI1 of FIG. 4*i* for the red barwidth is provided on the output line 64 while the measurement signals PI2 and PI3 for the green and blue barwidths are respectively provided on the output lines 65 and 66. These signals are provided as inputs to the barwidth identification circuit 60 and to a calculation circuit 67. The details of the calculation circuit 67 are provided hereinafter with reference to FIG. 6. The calculation circuit 67 receives the digital video signal from the digitizer 26 over the line 68 and also receives the inverse of the digital signal ($\overline{DV}$) over the line 69. The calculation circuit 67 calculates the actual average widths of the transparent spaces 12 and the opaque lines 11 and provides the calculated average widths to a printer 71 and/or a visual display 72.

In FIG. 7, the transparent space widths are identified as $\phi 1$, $\phi 2$ and $\phi 3$, the line widths as L1, L2 and L3 and the period of the color barwidth patterns as S1, S2 and S3. The manner of calculating these parameters is explained hereinafter with reference to FIG. 6.

In FIG. 1, the barwidth measurement signals from the barwidth measurement circuit 62 are input to the barwidth identification circuit 60. The barwidth identification circuit 60 also receives the color tracking signals on the output lines 57, 58 and 59 of the sequence identification circuit 56. Accordingly, as the barwidth signals are received from the measurement circuit 62, they are correlated with the color identification of the barwidth being measured and provided by a set of output lines 73 to the printer 71 and the display 72.

Figure 2:
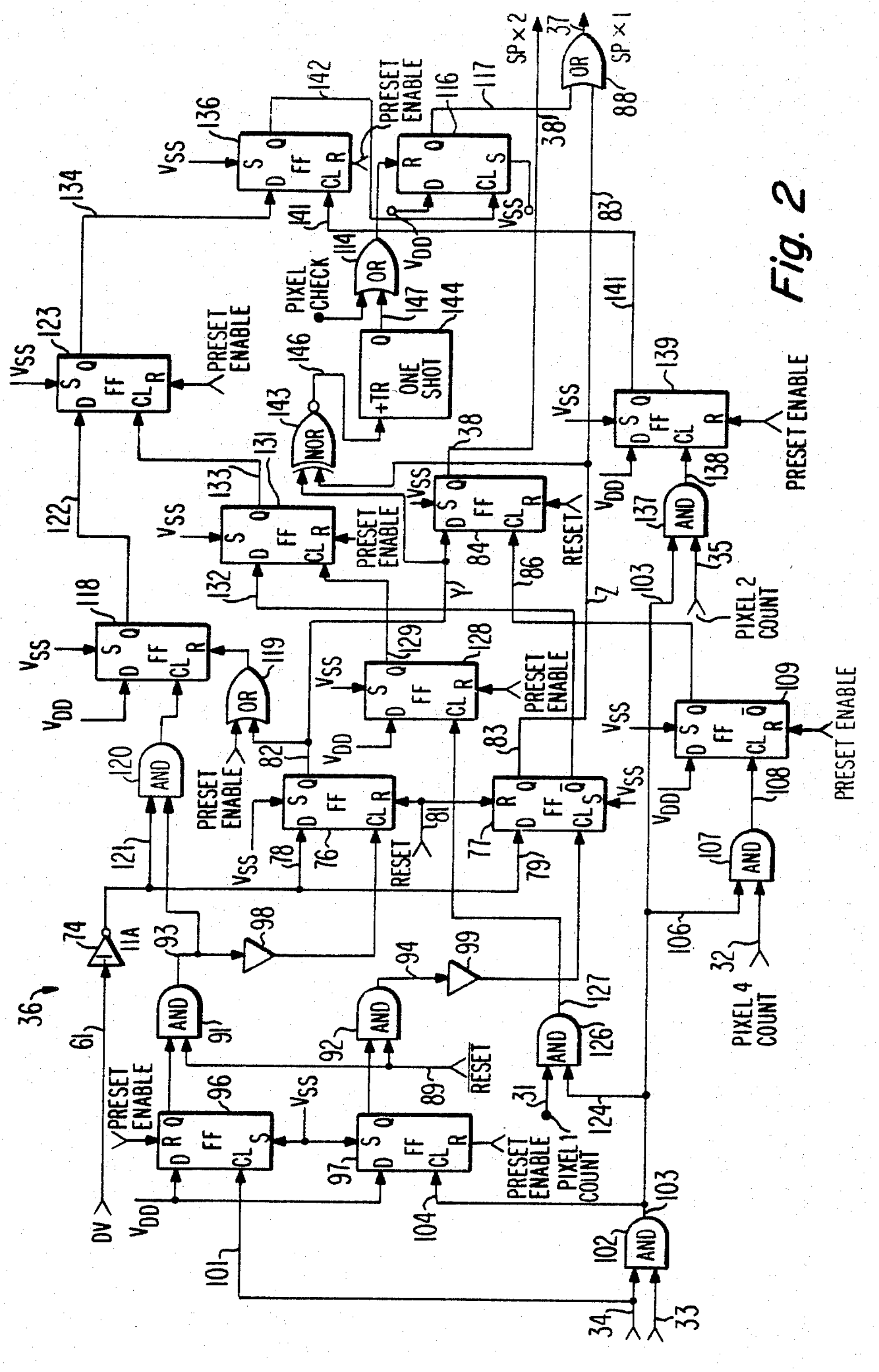
FIG. 2 is a diagram of a pixel check circuit which can be used in the preferred embodiment of FIG. 1.

FIG. 2 shows the details of the pixel check circuit 36 of FIG. 1. It should be noted that a preset enable signal is applied to several (96, 97, 109, 119, 123, 128, 131, 136, 139) of the logic elements of the circuit of FIG. 2, this signal preceeds each of the 64 scannings of the photodiode array 16 explained hereinabove. The reset signal which is applied to other logic elements (76, 77, 84) occurs when the panel 13 is first moved to the edge of the matrix pattern prior to starting movement toward position #1 of FIG. 10, and does not occur again for that particular panel. This permits the continuous tracking of the location of pixels 256 and 264 for the entire panel.

The digital video signal on the input line 61 is applied by an inverter 74 to the D input of D-type flip-flops 76 and 77 by lines 78 and 79, respectively. For the photodiode array 16 when a pixel is dark, the output signal of that particular pixel is high. Likewise when a pixel is illuminated, the output of that pixel is low. However, in the explanation of FIGS. 8 and 9 the SPX1 and SPX2 signals are low when the pixels 256 and 264 are dark. This is the reverse of the operation of the photodiode array and is occasioned by the inverter 74.

The reset signal is applied to the input line 81 and to the reset inputs of the flip-flops 76 and 77. However, because no clock input is initially received by the flip-flops 76 and 77 the output lines 82 and 83 are low. The low Q output of the flip-flop 76 on the line 82 is coupled to the D-input of a flip-flop 84, and accordingly the Q-output of the flip-flop 84 on line 38 also is low. Accordingly, the SPX2 signal on the line 38 is low as shown in position (a) of FIG. 8. Also, the Q-output of the flip-flop 77 on the line 83 is low because no clock input is applied to the clock input 77. Line 83 is coupled as input to an OR Gate 88 the output line 37 of which is also low. The SPX1 signal on the line 37, therefore, also is low as required by position (a) of FIG. 8.

The inverse ($\overline{\text{RESET}}$) the reset signal, which is provided when the panel 13 initially starts moving is provided by a line 89 as an input to two And Gates 91 and 92. The ($\overline{\text{RESET}}$) signal thus enables the AND Gates 91 and 92 during normal operation of the system. The Q-outputs of two flip-flops 96 and 97 provide the second input to the And Gates 91 and 92, respectively. The Q outputs are low and, therefore, the output lines 93 and 94 of the And Gates 91 and 92, respectively, also are low. The output line 93 of the And Gate 91 is coupled to the clock input of the flip-flop 76 through a delay 98. Similarly, the output line 94 of the And Gate 92 is coupled to the clock input of the flip-flop 77 through a delay 99. The delays 98 and 99 are used to slightly delay the application of the outputs of the And Gates 91 and 92 to avoid edge comparisons of the signals.

Initially, the Q outputs of the flip-flops 96 and 97 are low and remain so until clocking of one of them occurs. The output lines 33 and 34 of the pixel counter circuit 24 (FIG. 1) respectively receive the pixel 8 count and the pixel 256 count. The input line 34 is coupled by a line 101 to the clock input of the flip-flop 96. Accordingly, when the pixel 256 count is received, the flip-flop 96 is clocked and the Q output goes high to clock the flip-flop 76. The Q output of the flip-flop 76 on line 82 follows the D input on line 78. The D input on line 78 is high when a space 12 is over pixel 256 and the Q-output of the flip-flop 76 on the line 82 goes high making the D input of the flip-flop 84 go high. However, the Q-output of the flip-flop 84 on the line 38 remains low because the clock input 86 remains low. The SPX2 signal therefor remains low.

The output lines 33 and 34 of the pixel counter circuit 24 (FIG. 1) respectively couple the pixel 8 count and the pixel 256 count to an And Gate 102. The output line 103 of the And Gate 102 goes high when both the input lines 33 and 34 are high. The counter within the counter circuit 24 is a binary counter, and, therefore, the line 103 goes high on the first pixel 8-count after the pixel 256 count. This occurs on pixel 264. Line 103 is coupled by a line 104 to the clock input of the flip-flop 97. Accordingly, on the count of 264, the flip-flop 97 is clocked and the Q-output goes high to clock the flip-flop 77 via the AND Gate 92, line 94 and the delay 99. The Q-output of the flip-flop 77 on line 83 follows the D-input on line 79. The D-input on line 79 is high when a space 12 is over pixel 264 and the Q-output of the flip-flop 77 goes high. The output line 83 also goes high and the SPX1 signal on the output line 37 of the OR Gate 88 goes high.

The output line 103 of the And Gate 102 also is coupled as an input to an And Gate 107 by a line 106. The And Gate 107 also receives the pixel 4 count on the output line 32 of the counter circuit 24. Accordingly, the output line 108 of the And Gate 107 goes high on the first 4 count after the 264 count, which is the 268 count. When the line 108 goes high, a flip-flop 109 is clocked and the Q-output goes high to clock the flip-flop 84 by way of the line 86. When the flip-flop 84 is clocked, the Q-output goes high and the SPX2 signal on the line 38 also goes high. Accordingly, the SPX1 and SPX2 signals continuously sequence through the changes shown in FIGS. 8 and 9 during the scanning of the complete array 16.

Figure 11:
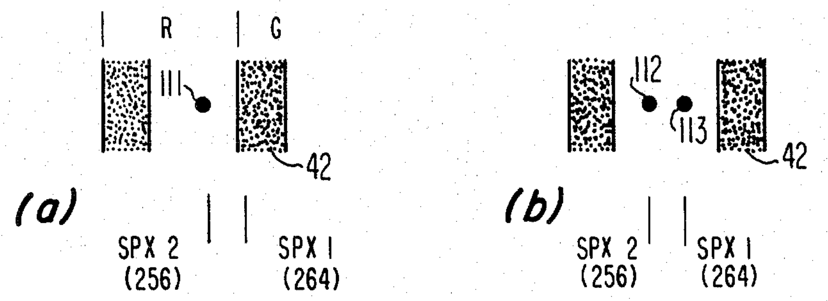
FIG. 11 is useful in understanding how splashes in the transparent spaces could cause erroneous color identification.

It is possible for splashes of the black matrix material to exist in some of the transparent spaces 12 and give an erroneous indication of barwidth changes. Two such conditions are illustrated as conditions (a) and (b) in FIG. 11. In condition (a) when the panel 13 stops movement prior to scanning, pixel 256 is beneath a splash 111 and pixel 264 is beneath an opaque bar 42. Accordingly, SPX2 and SPX1 will both be low and in accordance with conditions (e) or (i) of FIG. 8 it would appear that a color bar change has been reached. Condition (b) of FIG. 11 is similar to condition (a) in that when the panel stops movement pixel 256 is beneath a splash 112 and pixel 264 is beneath a splash 113 and SPX1 and SPX2 both are low again fulfilling the conditions (e) and (i) of FIG. 8. Such erroneous readings are prevented by investigating for light between pixels 256 and 264 and prohibiting a barwidth change indication when such light exists. In FIG. 2 a pixel check input is provided to an OR Gate 114 and is high at all times that the panel 13 is in motion. A flip-flop 116 receives the output of the OR Gate 114 as a reset input and the Q-output on a line 117 is low while the panel 13 is in motion. The OR Gate 88 also receives the Q-output of the flip-flop 77 from the line 83 and, therefore, is free to track the Q-output of the flip-flop 77 until the flip-flop 116 is clocked by a flip-flop 136 when the pixel check signal is low. As explained above, prior to the pixel 264 count, the Q-output of the flip-flop 76 on the line 82 is low. This low is applied to the reset input of a flip-flop 118 through an OR Gate 119 which also receives the preset enable input. The D input of the flip-flop 118 is biased high and accordingly the Q-output of the flip-flop 118 goes high whenever a clock input is received from an AND Gate 120, which receives input from the lines 93 and 121. The output of the AND Gate 120 goes high when a pixel following pixel 256 is over a space 12. When the AND Gate 120 clocks the flip-flop 118, the Q-output goes high. This output is applied by a line 122 to the D input of a flip-flop 123. The Q-output of the flip-flop 123 remains low until a clock input is received from a flip-flop 131 over a line 133.

The output of the And Gate 102 is connected by a line 124 to one input of an And Gate 126. The other input of the AND Gate 126 receives the pixel 1 count available on the output line 31 of the counter circuit 24 (FIG. 1). Accordingly, the output line 127 goes high on the count of 265 and clocks a flip-flop 128. When the flip-flop 128 is clocked, the Q-output goes high to clock a flip-flop 131 over a line 129. The D input of the flip-flop 131 receives the high $\overline{Q}$ output of the flip-flop 77 from the line 132 causing the Q-output of the flip-flop 131 on the line 133 to go high and clock the flip-flop 123. The Q-output of the flip-flop 123 on the line 134 goes high. The high on the line 134 is applied to the D-input of a flip-flop 136. The Q output of the flip-flop 136 remains low until a clock input is received from the flip-flop 139 and a line 141.

The output line 103 of the And Gate 102 is also coupled as an input to an And Gate 137. The other input of the And Gate 137 receives the pixel 2 count available on the output line 35 of the counter circuit 24 (FIG. 1). Accordingly, on pixel count 266, the output line 138 of the AND Gate 137 goes high to clock the flip-flop 139. When the flip-flop 139 is clocked, the Q-output on the line 141 goes high to clock the flip-flop 136. When the flip-flop 136 clocks the Q-output on the line 142 goes high and clocks the flip-flop 116 causing the Q-output of the flip-flop 116 available on the line 117 to go high. The SPX1 output signal on the line 37 of the OR Gate 88 goes high and prohibits an erroneous indication of a bar width change because such changes require SPX1 to go low.

The condition shown in FIG. 11(*a*) can also cause an erroneous indication when the panel is moved from left to right because it appears that condition (c) of FIG. 9 has been met. Accordingly, when motion is resumed, or continued, and pixel 256 moves from the splash 11, and pixel 264 remains under line 42, it erroneously could appear that condition (d) of FIG. 9 is met. This is avoided by an Exclusive NOR 143 and a one shot 144. The Q-output of flip-flop 116 remains high until the motion of the panel causes pixels 256 and 264 to be the same, at which time the output line 146 of the exclusive NOR 143 goes high to trigger the one shot 144. The Q output provides a brief high pulse to reset the flip-flop 116 over line 147 and the OR Gate 114. The clock input of the flip-flop 116 on the line 142 functions as previously described. If no clock occurs on the line 142, the Q-output of the flip-flop 116 stays low enabling the SPX1 output of the OR Gate 37 to follow line 88 and thereby avoiding an erroneous color change indication.

Figure 3:
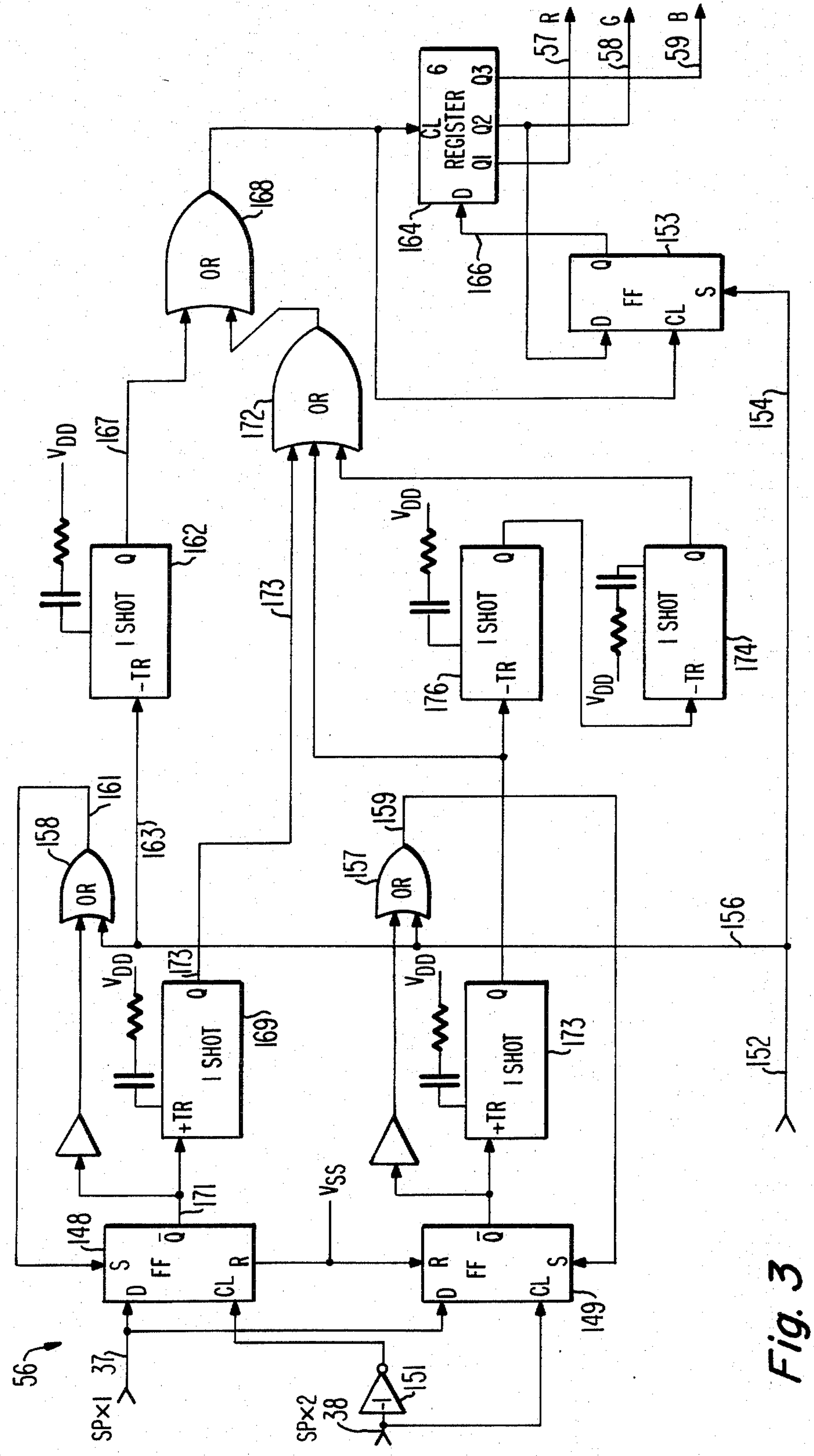
FIG. 3 is a diagram of a sequence identification circuit which can be used in the system of FIG. 1.

FIG. 3 shows the details of the sequence identification circuit 56 of FIG. 1. The SPX1 and SPX2 signals available on the output lines 37 and 38 of the pixel check circuit 36 of FIG. 2 are provided as inputs to the sequence identification circuit 56. The SPX1 signal on the line 37 is input to the D input of two flip-flops 148 and 149. The SPX2 signal on the line 38 is coupled to the clock input of the flip-flop 149 and to the clock input of the flip-flop 148 through an inverter 151. The reset signal, which is the same as the reset signal applied to the logic elements of FIG. 2, is received on an input line 152. The line 152 is coupled to the set input of a flip-flop 153 by a line 154. The reset input on line 152 also is coupled by a line 156 to one input terminal of two OR Gates 157 and 158. The output line 159 of the OR Gate 157 is coupled to the set input of the flip-flop 149. Similarly, the output line 161 of the OR Gate 158 is coupled to the set input of the flip-flop 148. The initial reset pulse on the line 152 is also coupled to the negative trigger input of a one-shot 162 by a line 163.

When the initial reset pulse is received on the line 152, the Q-output of the flip-flop 153 goes high. The Q-output of the flip-flop 153 is connected to the D input of shift register 164 by a line 166. Accordingly, the D input of the register 164 also is high. Simultaneously, the $\overline{Q}$ outputs of the flip-flops 148 and 149 go low. The negative edge of the reset pulse triggers the one-shot 162 causing the Q output on the line 167 to go high, and clock the shift register 164 through an OR Gate 168. The Q1 output of the shift register 164 goes high and the output line 57 goes high indicating that pixel 264 coincides with the red color bandwidth, which is the initial starting point.

Motion of the panel 13, from right to left, causes pixel 264 to move into a transparent space and condition (b) of FIG. 8 is met when SPX1 goes high. The D inputs of the flip-flops 148 and 149 then are high, but the $\overline{Q}$ outputs do not change because there is no positive edge to the clock inputs of two flip-flops. Motion of the panel 13 continues and condition (c) of FIG. 8 is met and SPX2 goes high to clock the flip-flop 149. However, the $\overline{Q}$ output of the flip-flop 149 remains unchanged because the D input is high. The high SPX2 is inverted by the inverter 151 before being applied to the clock of flip-flop 148 and, therefore, the $\overline{Q}$ output of the flip-flop 148 also remains unchanged. Motion continues until condition (d) of FIG. 8 is met when SPX1 goes low to apply a low input to the D inputs of the flip-flops 148 and 149. However, no changes occur because there is no positive edge to the clock inputs of the two flip-flops 148 and 149. When the continuing motion of the panel 13 causes condition (e) of FIG. 8 to be met, SPX2 goes low, this low is inverted by the inverter 151 to a positive pulse to the clock input of the flip-flop 148. This causes the $\overline{Q}$ output of flip-flop 148 to go high to trigger the positive input of a one-shot 169 over a line 171. When the one-shot 169 triggers the Q-output goes high to clock the shift register 164 by way of the line 173, the OR Gate 172, and the OR Gate 168. When the register 164 triggers the Q2 output goes high and the Q1 output returns to low thereby indicating that the green color barwidth coincides with SPX1 and SPX2. This operation sequentially continues for all three color bar widths during the scanning of the diode array 16.

When the motion of the panel 13 is from the left to right, the conditions (a)–(h) of FIG. 9 cause the changes in the output lines 57, 58 and 59 of FIG. 3. In this instance, the two one-shots 173 and 174 control the sequencing in the same manner as the one-shot 169 controls when the motion is from right to left of FIG. 8. The one-shot 176 between the one-shots 173 and 174 is used as a delay because one extra count is needed to cause color change indications when the motion is from right to left.

Figure 4:
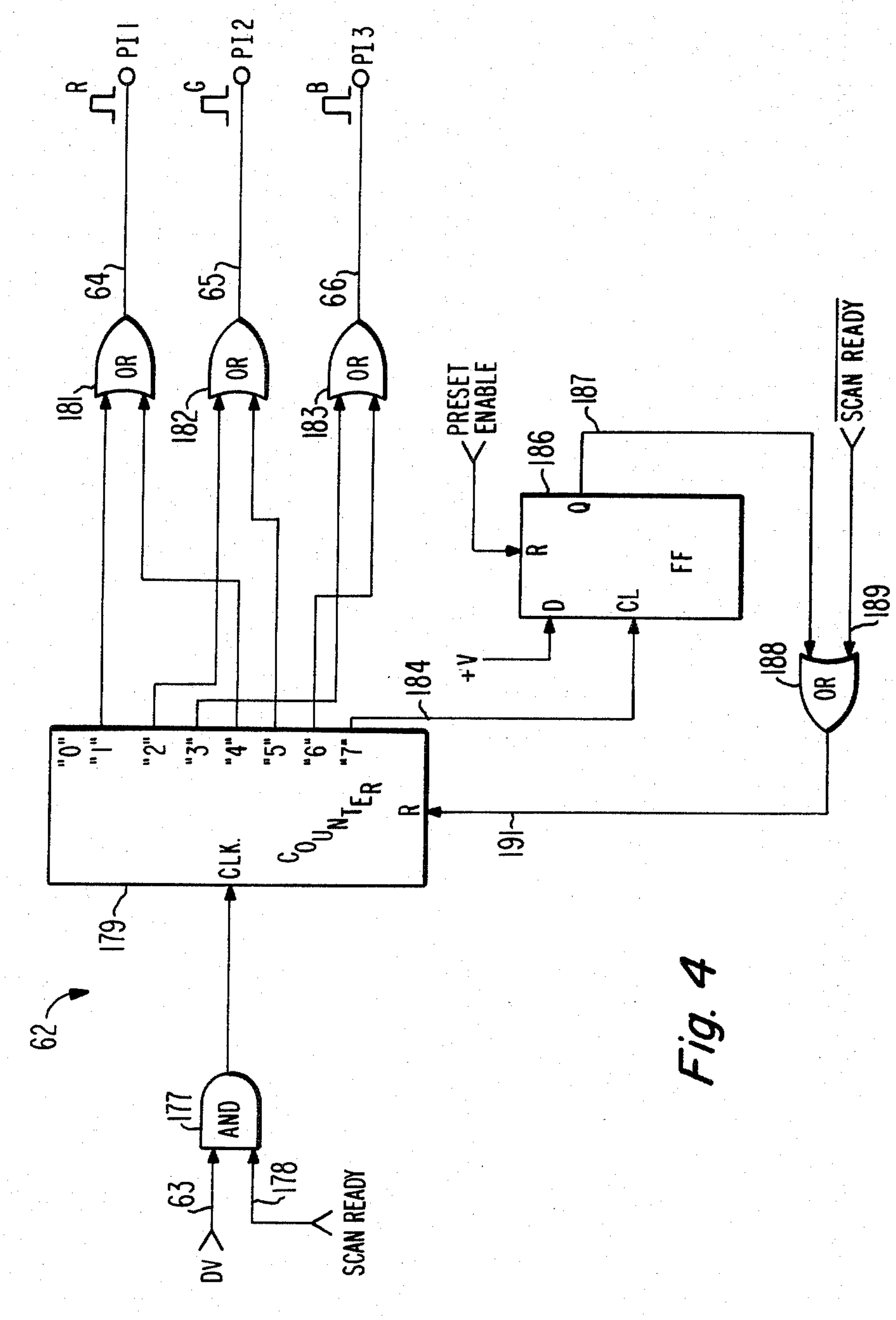
FIG. 4 is a diagram of a measurement circuit which can be used in the system of FIG. 1.
Figure 4A:
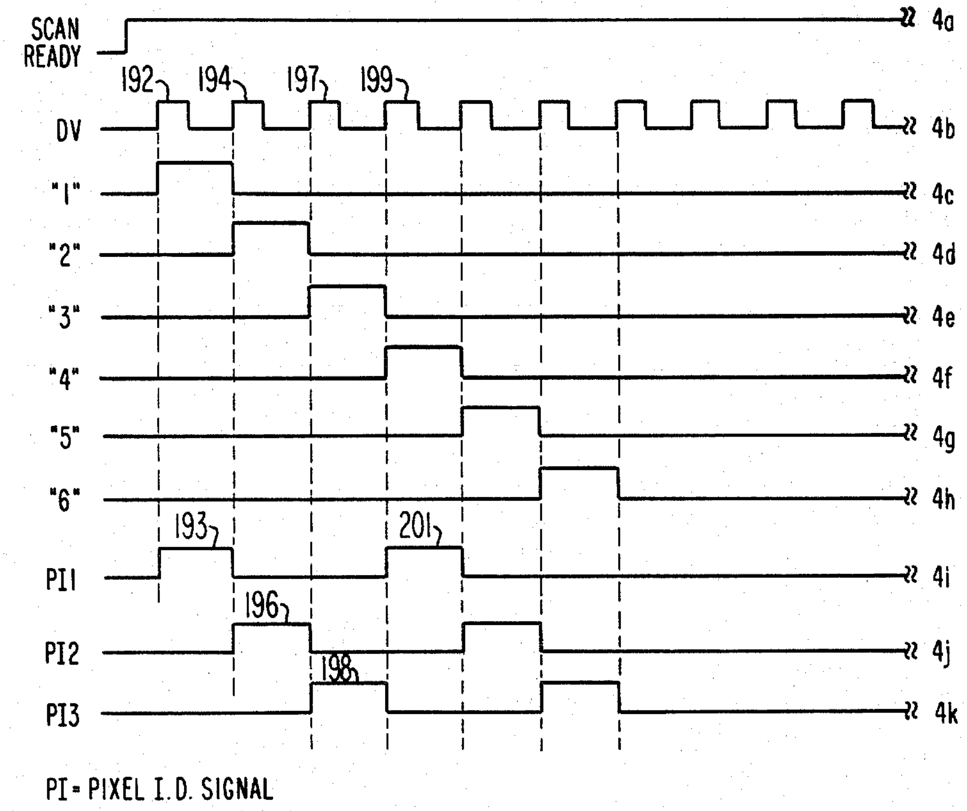
FIG. 4A shows waveforms 4*a*–4*k* useful in understanding the operation of the measurement circuit of FIG. 4.

FIG. 4 and the waveform diagrams 4*a*–4*k* of FIG. 4A show the construction and operation of the barwidth measurement circuit 62 of FIG. 1. In FIG. 4, the digital video signal from the digitizer circuit 26 of FIG. 1 is applied as an input to an And Gate 177 which also receives a scan ready signal from an input line 178. The output of the And Gate 177 is coupled to the clock input of a counter 179, the outputs of which are coupled in the manner shown to OR Gates 181, 182 and 183. The outputs of the OR Gates 181, 182 and 183 are coupled to the output lines 64, 65 and 66 respectively of the barwidth measurement circuit 62 and thus are provided as inputs to the barwidth identification circuit 60 of FIG. 1. The "7" output terminal of the counter 179 is coupled by a line 184 to the clock input of a flip-flop 186. The Q-output of the flip-flop 186 is coupled by a line 187 to an input of an OR Gate 188. The other input of the OR Gate 188 is coupled by a line 189 to a $\overline{\text{SCAN READY}}$ input. The output of the OR Gate 188 is coupled by a line 191 to the reset input of the counter 179.

Initially, the preset enable signal which is applied to the circuits previously described with respect to FIGS. 1–3 is applied to the reset input of the flip-flop 186. The scan ready waveform 4*a* of FIG. 4A is applied to input line 178 of the And Gate 177 and the gate is enabled. The digital video signal (DV) available on line 63 passes through the And Gate 177 to clock the counter 179 one count. Thus, the pulse 192 of waveform 4*b* is passed through the OR Gate 181 and the output line 64 goes high indicating that the barwidth being measured is one particular color, for example the red color, as shown by the pulse 193 of waveform 4*i*. Thus, each time the line 64 goes high, the PI1 (pixel identification signal) is high to identify a red color barwidth. The positive transition of the next digital video pulse 194 clocks the counter 179 causing the "1" output to go low and the "2" output to go high. The OR Gate 182 is enabled and the line 65 goes high for the green barwidth (PI2) as shown by pulse 196 in waveform 4*j*. The positive transition of the next digital video pulse 197 makes the "3" output of the counter 179 go high and the "2" output return to low. The output of the OR Gate 183 on the line 66 goes high for the blue barwidth (PI3) as indicated by pulse 198 in waveform 4*k*. The positive transition of the fourth digital video pulse 199 causes the "4" output of the counter 179 to go high and, therefore, the output of the OR Gate 181 again goes high causing line 64 to go high as indicated by pulse 201 in waveform 4*i*. This operation continues until the "7" output of the counter 179 goes high to clock the flip-flop 186 causing the Q-output to go high and reset the counter 179 by way of the lines 187, 191 and the OR Gate 188. After a line is scanned, the $\overline{\text{SCAN READY}}$ signal on line 189 goes high and resets the counter 179 through the OR Gate 188 and line 191.

Figure 5:
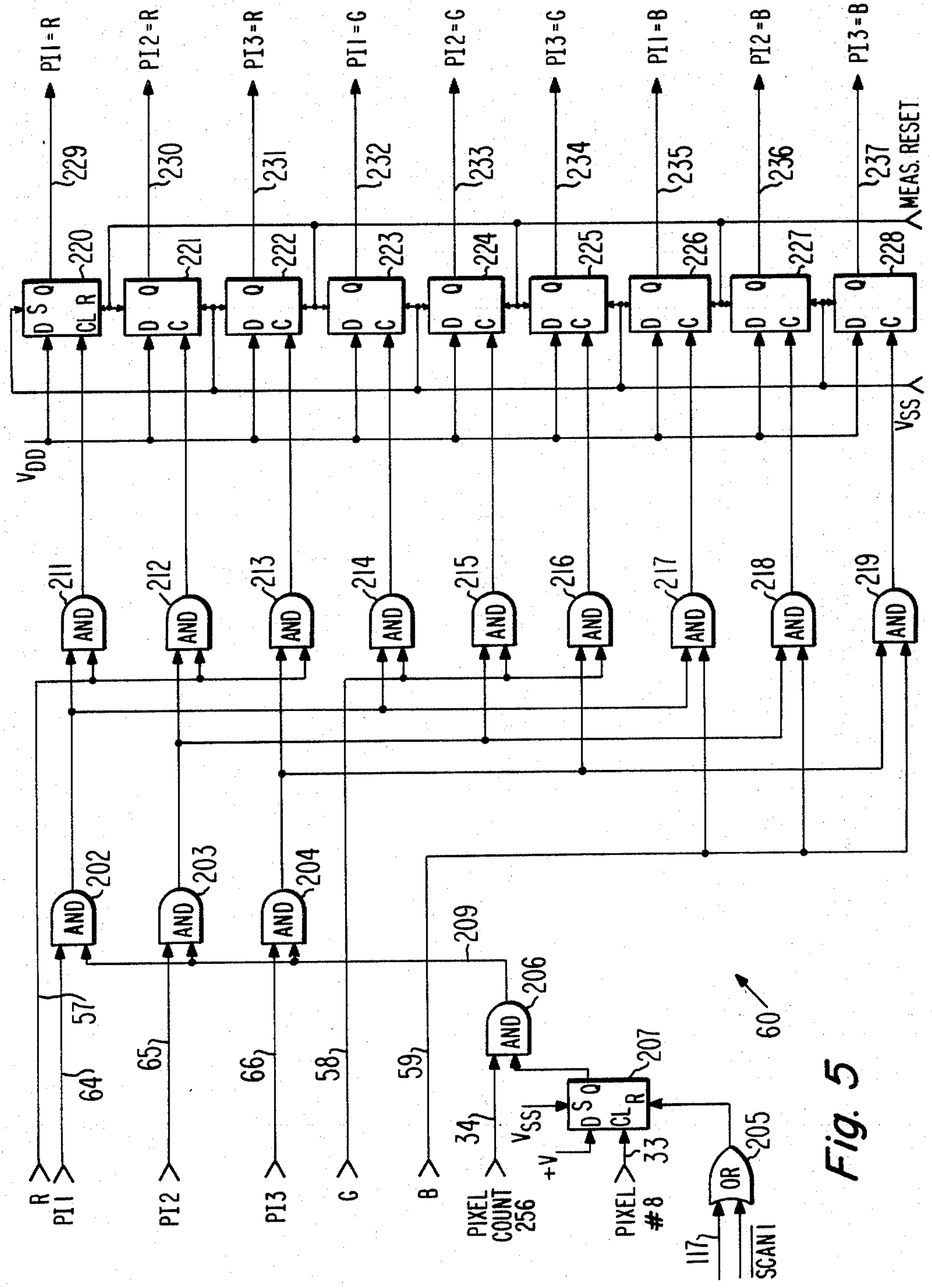
FIG. 5 is a diagram of a barwidth identification circuit which can be used in the system of FIG. 1.

FIG. 5 shows the barwidth identification circuit 60 of FIG. 1 in detail. The PI1, PI2 and PI3 signals from the barwidth measurement circuit 62 are respectively applied by lines 64, 65 and 66 to three And Gates 202, 203 and 204. The And Gates 202, 203 and 204 are enabled by an AND Gate 206 which is enabled by the pixel count 256 signal and the Q-output of a flip-flop 207. The flip-flop 207 is enabled during the first scan of the photodiode array by a low on the reset input when the splash conditions (a) and (b) of FIG. 11 do not exist. An OR Gate 205 receives the output of the pixel check circuit 36 on line 117 (FIG. 1) and the $\overline{\text{SCAN}}$ signal as inputs. The signal on the line 117 is low when the splash conditions are not present and the $\overline{\text{SCAN}}$ is low during the first scan of the photodiode array 16 (FIG. 1). When both of these signals are low, the flip-flop 207 is enabled. The pixel 8 count on line 33 clocks the flip-flop 207 and Q output goes high to enable the AND Gate 206. The output of the And Gate 206 is coupled by a line 209 to the other terminal of the AND Gates 202, 203 and 204.

A series of And Gates 211, 212 and 213 receive the R output available on the output line 57 of the sequence identification circuit 56 of FIG. 1 as an input. Additionally, the And Gates 211, 212 and 213 receive an input from the And Gates 202, 203 and 204 respectively. Similarly, a second series of And Gates 214, 215 and 216 receive the G-output available on the output line 58 of the sequence ID circuit 56. The And Gates 214, 215 and 216 also receive an input from the And Gates 202, 203 and 204 respectively. A third series of And Gates 217, 218 and 219 similarly receive the B output on output line 59 of the sequence identification circuit 56 and also receive an input from the And Gates 202, 203 and 204 respectively.

The output terminals of the And Gates 211–219, respectively, are coupled to the clock inputs of a series of flip-flops 220–228. The Q-outputs of the flip-flops 220–228, respectively, are coupled to the output lines 229–237.

The circuit of FIG. 5 thus serves to identify the PI1, PI2 and PI3 signals shown in FIG. 4A as the red, green or blue signals provided by the sequence identification circuit 56 of FIG. 1. For example, when the PI1 signal and the pixel count 256 input are simultaneously high during the first scan, the output of the AND Gate 202 goes high. When the output of AND 202 and the R input on the line 57 are simultaneously high, the And Gate 211 is enabled. The flip-flop 220 is clocked and the Q-output on the line 229 goes high identifying the PI1 signal as the red color. Similarly, if the PI1 signal on line 64 is high to enable AND Gate 202 and the G signal on line 58 is high, the And Gate 214 is enabled causing the output line 232 of the flip-flop 223 to go high thereby identifying the PI1 signal as the green color.

The flip-flops 220–228 are reset before each measurement by the measure reset signal. Only one of the output lines 229–237 is high at any time and, therefore, each measurement is correlated with a particular color. The sequence of colors and measurements is known and, therefore, all measurements are correlated with a particular color. If either of the FIG. 11 splash conditions exist during the first scan, the AND Gate 206 is not enabled and the splash condition is identified. The panel can be moved to a slightly different position and a measurement taken.

The output lines 229–227 can be connected as inputs to the printer 71 or display 72 to provide a visual indication of the color identification.

Figure 6:
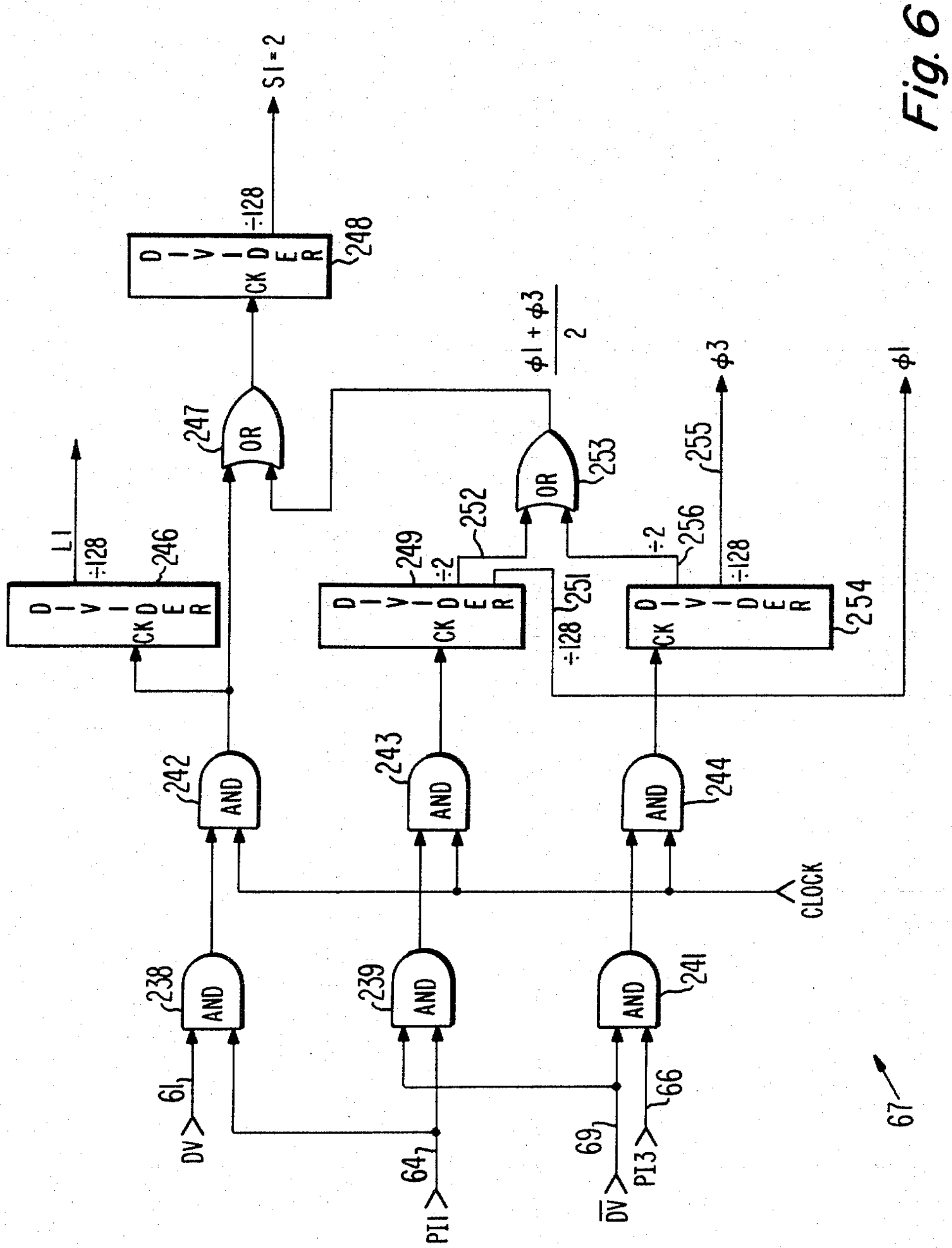
FIG. 6 is a diagram of a calculation circuit which can be used in the system of FIG. 1.

FIG. 6 shows the details of a portion of the calculation circuit 67 of FIG. 1. The calculation circuit 67 measures the transparent space widths, the opaque line widths, and the periods $\phi$ of the spacing and line width combinations. In FIG. 7, the spaces for the three colors red, green and blue are respectively identified as $\phi 1$, $\phi 2$ and $\phi 3$ and the opaque lines as L1, L2, and L3. The periods S1, S2 and S3 are the center to center spacing of adjacent transparent line segments. The periods are thus defined as:

$$S1 = L1 + \frac{\phi1 + \phi3}{2}$$

$$S2 = L2 + \frac{\phi1 + \phi2}{2}$$

$$S3 = L3 + \frac{\phi2 + \phi3}{2}$$

In FIG. 6, the digital video signal available on the line 61 is provided as an input to an And Gate 238. The PI1 signal available on the line 64 is provided as the second input to the And Gate 238 and as input to another And Gate 239. The $\overline{DV}$ signal available on the line 69 is provided as the second input to the And Gate 239 and as an input to an And Gate 241. The other input of the other And Gate 241 receives the PI3 signal available on the line 66. The outputs of the And Gates 238, 239 and 241 respectively provide inputs to a series of And Gates 242, 243 and 244. The other input terminals of the And Gates 242–244 are coupled to a clock, such as a 3.27 mHz, input. The output of the And Gate 242 is coupled as an input to a divider 246. The divider 246 divides the pulse train output of the And Gate 242 by 128 to yield a pulse train which is indicative of the average width of L1 of FIG. 7. The output of the And Gate 242 also is provided as an input to an OR Gate 247 the output of which clocks a divider 248 which divides the input by 128. The output of the And Gate 243 is provided to the clock input of a divider 249 which has two output lines 251 and 252. The output on the line 251 is the input divided by 128 and thus is a pulse train representative of the average width of the transparent space φ1. The output on the line 252 is the input divided by 2 and thus is a pulse train representative of half the width of the space φ1, i.e. $\phi\frac{1}{2}$. The output on the line 252 is provided to an OR Gate 253.

The output of the And Gate 244 serves as the clock input to a divider 254 which also has two output lines 255 and 256. The line 255 is the input divided by 128 and thus is a pulse train representative of the average width of transparent opening φ3. The output available on output line 256 is the input divided by 2 and thus is a pulse train representative of half the width of the transparent space φ3. The output on the line 256 also is input to the OR Gate 253. Accordingly the output of OR Gate 253 is equal to $100\,\frac{1}{2}+\phi3/2$ because the OR Gate 253 provides an output when either the And Gate 243 or 244 is clocking one of the dividers 249 or 254. The output of the OR Gate 253 is provided as the second input to the OR Gate 247 and accordingly the divider 248 is clocked when either of the And Gates 238, 239 or 241 is clocked. The output of the divider 248, therefore, is:

$$S1 = L1 + \frac{\phi3 + \phi1}{2}$$

FIG. 6 thus is representative of one-third of the calculation circuit 67 of FIG. 1. Two identical circuits also are present in the calculation circuit 67. One of the additional circuits receives the PI1 and PI2 inputs to calculate S2 and the other receives the PI2 and PI3 input signals to calculate S3.

The outputs of the calculation circuit 67 can be provided to the printer 71 or display 72 to give either a visual or printed indication of the measurements taken.

What is claimed is:

1. A system for measuring matrix barwidths wherein each barwidth includes an opaque line and a transparent space, said barwidths being grouped into sets of barwidths with the corresponding barwidth of each set being sequentially identified, said system having an array of energy responsive pixels, each of said pixels providing an analog pixel signal one level when energy is received from one of said lines, and another level when energy is received from one of said spaces whereby said array provides an analog video signal varying between said levels in accordance with said lines and spaces, said system comprising:

quantizer circuit means for receiving said analog video signal and providing a digital video signal;

counter means responsive to a particular transition of each of said pixel signals for providing a pixel count output, said pixel count output identifying which of said pixels provided each pixel signal;

pixel check circuit means responsive to said counter means for providing at least two selected pixel signals from at least two selected pixels, said selected pixels being spaced on said array whereby the spacing between said selected pixels is less than the width of said space, both of said selected pixel signals initially having one of said levels and subsequently having the other of said levels and returning to said one level when both of said selected pixels transfer from the space of one of said barwidths to the line of the next of said bar widths;

barwidth sequential identification means responsive to said selected pixel signals for providing barwidth identification signals when said selected pixel signals return to said one level;

measurement circuit means responsive to said digital video signal for sequentially providing width signals representative of the widths of said barwidths;

barwidth identification means responsive to said width signals and to said barwidth identification signals for providing the sequential identification of said barwidths; and calculation circuit means responsive to said digital video signal and to width signals for providing calculated barwidth signals and calculated space width signals.

2. The system of claim 1 wherein said matrix is present on the faceplate of a kinescope panel whereby each of said sets includes three of said barwidths sequentially identified as red, green and blue.

3. The system of claim 2 wherein said system further includes light means for illuminating said matrix, detector means for receiving light from said matrix and providing said analog video signal and scanner means for scanning said light along said array.

4. The system of claim 3 wherein said pixel check circuit means includes logic means for changing the state of said selected pixel signals as said selected pixels receive light from said lines and said spaces.

5. The system of claim 4 wherein said barwidth sequential identification means includes barwidth logic means and register means responsive to said barwidth logic means for sequentially providing said red, green and blue barwidths.

6. The system of claim 5 wherein said measurement circuit means includes second counter means responsive to said digital video signal, and gate means responsive to said second counter means for providing said width signals in accordance with the width of said opaque lines and said transparent spaces.

7. The system of claim 6 wherein said calculation circuit means includes logic means for providing said calculated barwidth signals and said calculated space width signals in accordance with $$S_1 = L_1 + \frac{\phi_1 + \phi_3}{2}$$

$$S_2 = L_2 + \frac{\phi_1 + \phi_2}{2}$$

$$S_3 = L_3 + \frac{\phi_2 + \phi_3}{2}$$

where:

$S_1$ $S_2$ and $S_3$ respectively are said barwidth signals,
$L_1$ $L_2$ and $L_3$ respectively are said line widths,
$\phi_1$, $\phi_2$ and $\phi_3$ respectively are said space widths.

8. The system of claim 6 wherein said calculation circuit means includes logic means for providing said calculated barwidth signals and said calculated space width signals in accordance with $$S_1 = L_1 + \frac{\phi_1 + \phi_3}{2}$$

$$S_2 = L_2 + \frac{\phi_1 + \phi_2}{2}$$

$$S_3 = L_3 + \frac{\phi_2 + \phi_3}{2}$$

where:

$S_1$ $S_2$ and $S_3$ respectively are said barwidth signals,
$L_1$ $L_2$ and $L_3$ respectively are said line widths,
$\phi_1$, $\phi_2$ and $\phi_3$ respectively are said space widths.

9. The system of claim 4 further including spaced detection logic means for indicting opaque spaces in said transparent spaces.

10. The system of claim 9 wherein said barwidth sequential identification means includes barwidth logic means and register means responsive to said barwidth logic means for sequentially providing said red, green and blue barwidths.

11. The system of claim 10 wherein said measurement circuit means includes second counter means responsive to said digital video signal, and gate means responsive to said second counter means for providing said width signals in accordance with the width of said opaque lines and said transparent spaces.

12. The system of claim 11 wherein said calculation circuit means includes logic means for providing said calculated barwidth signals and said calculated space width signals in accordance with $$S_1 = L_1 + \frac{\phi_1 + \phi_3}{2}$$

$$S_2 = L_2 + \frac{\phi_1 + \phi_2}{2}$$

$$S_3 = L_3 + \frac{\phi_2 + \phi_3}{2}$$

where:

$S_1$ $S_2$ and $S_3$ respectively are said barwidth signals,
$L_1$ $L_2$ and $L_3$ respectively are said line widths,
$\phi_1$, $\phi_2$ and $\phi_3$ respectively are said space widths.

13. The system of claim 1 wherein said pixel check circuit means includes logic means for changing the state of said selected pixel signals as said selected pixels receive light from said lines and said spaces.

14. The system of claim 13 wherein said bar width sequential identification means includes barwidth logic means and register means responsive to said bar width logic means for sequentially providing said red, green and blue barwidths.

15. The system of claim 14 wherein said measurement circuit means includes second counter means responsive to said digital video signal, and gate means responsive to said second counter means for providing said width signals in accordance with the width of said opaque lines and said transparent spaces.

* * * * *